United States Patent [19]
Capelle et al.

[11] Patent Number: 5,244,373
[45] Date of Patent: * Sep. 14, 1993

[54] EXTRUDER FOR POORLY MISCIBLE EXTRUDATES

[75] Inventors: Gerd Capelle, Langenhagen; Martin Preuss, Hanover, both of Fed. Rep. of Germany

[73] Assignee: Hermann Berstorff Maschinenbau GmbH, Hanover, Fed. Rep. of Germany

[*] Notice: The portion of the term of this patent subsequent to Jul. 7, 2009 has been disclaimed.

[21] Appl. No.: 806,276

[22] Filed: Dec. 13, 1991

[30] Foreign Application Priority Data

Dec. 14, 1990 [DE] Fed. Rep. of Germany ....... 4039942

[51] Int. Cl.5 .................. B29C 47/62; B29C 47/64
[52] U.S. Cl. ....................... 425/208; 264/211.21; 264/211.23; 366/88; 366/90
[58] Field of Search ............ 425/208; 366/88-90; 264/211.21, 211.23

[56] References Cited

U.S. PATENT DOCUMENTS

| | | | |
|---|---|---|---|
| 3,613,160 | 10/1971 | Loomans et al. | 425/209 |
| 4,178,104 | 12/1979 | Menges et al. | 366/80 |
| 4,569,595 | 2/1986 | Maillefer | 366/88 |
| 4,581,992 | 4/1986 | Koch | 366/90 X |
| 4,735,565 | 4/1988 | Capelle | 425/208 |
| 5,127,741 | 7/1992 | Capelle et al. | 425/208 X |
| 5,141,426 | 8/1992 | Capelle | 425/208 X |
| 5,145,352 | 9/1992 | Capelle et al. | 425/208 X |
| 5,147,198 | 9/1992 | Capelle | 425/208 X |

FOREIGN PATENT DOCUMENTS

| | | |
|---|---|---|
| 0062203 | 7/1986 | European Pat. Off. |
| 1142839 | 1/1963 | Fed. Rep. of Germany |
| 2731438 | 3/1983 | Fed. Rep. of Germany |
| 3133708 | 7/1986 | Fed. Rep. of Germany |
| 2068249 | 8/1981 | United Kingdom |

*Primary Examiner*—Richard L. Chiesa
*Attorney, Agent, or Firm*—Foley & Lardner

[57] ABSTRACT

An extruder for poorly miscible extrudates which includes a pin-lined barrel section and a transfer mixing section used together. Restricting pins are arranged in the transfer mixing section in the region of the greatest barrel channel volume and permit universal use of the extruder with respect to the extrudate. The combination of the two mixing systems allows in a surprising way an increase in the material throughput of 60% to 100% with the mixing quality remaining the same and a halving of the drive torque. Due to a constant number of channels of the barrel channels and screw channels, the number of barrel flights and screw flights remains independent of the channel cross-sectional area of barrel and screw. A helical barrel groove in the feed zone of the extruder barrel additionally improves the mixing quality of the extrudate and the output of the extruder.

13 Claims, 6 Drawing Sheets

EXTRUDER FOR POORLY MISCIBLE EXTRUDATES

BACKGROUND OF THE INVENTION

The invention relates to an extruder for the processing and production of rubber and thermoplastic materials. The invention comprises an improvement of the extruder disclosed in application Ser. No. 07/693,225, filed Apr. 29, 1991 and now U.S. Pat. No. 5,127,741, which is incorporated herein by reference.

In the past, widespread use has been made of so-called pin-lined barrel extruders, such as are known from German Offenlegungsschrift 2,235,784 or German Offenlegungsschrift 3,003,615, as discharging and homogenizing extruders. In extruders of this type, metal pins protrude radially through the extruder barrel into the processing space of the extruder, the extruder screw having interrupted screw flights in this zone to accommodate the pins.

These extruders are distinguished by a very high output rate and good homogenizing effect on the material to be processed and, in addition, permit an increased material throughput per unit time at the same screw speed in comparison with conventional cold-feed extruders with a screw having a shear section These advantages have resulted in pin-lined barrel extruders becoming the most frequently used extruders in the rubber industry in the last 15 years.

Independently of this, an extruder mixing section which has become known as the transfer mixing section has been developed and is disclosed in DE-A 1,142,839. This mixing section essentially comprises the feature that both the extruder screw and the inner wall of the extruder barrel are provided with grooves and flights over a certain length, the channel depth of the extruder screw decreasing to zero and subsequently increasing again in the longitudinal direction of the extruder barrel to the same degree as the channel depth of the barrel grooves respectively increases and decreases again. Due to this design of extruder screw and barrel, a complete extrudate exchange between the screw grooves and the barrel grooves is possible, which causes a good mixing effect.

The transfer extruder was able to claim a certain share of the market over the pin-lined barrel extruder, in particular, whenever the overall length of the 10 extruder was to be kept small.

In addition, it is known from U.S. Pat No. 3,613,160 to provide extruders with flow restricting components, by which the extrudate transport in the extruder can be variably controlled from the outside. According to this publication, an approximately cylindrical component is arranged for this purpose on the screw shank of the extruder screw, which component rotates along with the screw and completely blocks the processing space downstream. In the region of the cylindrical component, two restricting pins are, in each case, led through the extruder barrel from outside radially into an axially directed overflow channel, which is formed in the inner wall of the extruder barrel. With retracted restricting pins, part of the extrudate upstream of the cylindrical component can pass through these channels to the downstream extruder section. By moving the restricting pins into these overflow channels to different depths, this extrudate stream can be restricted.

In addition, German Patent 2,731,438 discloses a transfer extruder in which the number of flights in the barrel and on the screw in the transfer zone reduces as the cross-sectional area of the screw channels becomes greater, and increases as the cross-sectional area of the screw channels becomes smaller. In this case, screw channels of greater cross-sectional area have a greater width than screw channels of smaller cross-sectional area.

The tests carried out in the past on such mixing sections have indeed shown that comparatively good mixing qualities can be achieved with them, and that the mixing section is self-cleaning. However, what was disadvantageous was that such designs required a relatively high manufacturing outlay, for which reason the production costs were high.

Finally, it is known from German Offenlegungsschrift 3,133,708 and European Patent 0,062,203 to provide the inner side of the extruder barrel of single screw extruders with axial or helical barrel grooves in the feed zone. Such extruders are generally used for the extrusion of polymer materials of high melt viscosity, low thermal stability or low surface friction with respect to the metal surfaces of the extruder processing space. Such an extruder allows a high output rate at low melt temperatures and high melt pressures even in the case of those such extrudates which are difficult to process. In addition, due to the reduced shearing in the feed zone of the extruder, the extrudate can be plasticized gently and extruded surge-free.

SUMMARY OF THE INVENTION

Since, apart from improvements in details, the technology of mixing extruders has not changed in the last fifteen years, the present invention was based on the object of presenting a mixing and homogenizing extruder which, in comparison with the known apparatuses, permits an increased output rate with reduced investment costs and at least equally good mixing effect, and allows a distinctly shorter overall length and a broadening of the previous application areas of mixing and homogenizing extruders. The plasticizing work which can be accomplished by the new extruder should be freely adjustable in dependence on the properties of the extrudate.

By combining the two known designs of mixing sections, it was possible to create an extruder having considerable advantages over the mixing and homogenizing extruders of the described prior art.

For instance, with an extruder having a pin-lined barrel zone and a transfer zone having additional pins, it has been found that, with the same mixing quality and the same screw speed, the drive power of the extruder could be reduced by up to 50% and the melt throughput increased by up to 60% to 100%.

These excellent results bring about, furthermore, a 50% reduction in the drive torque, which results in a great reduction in the gear transmission costs in the production of the extruder. In addition, by combining the pin-lined barrel technology and the transfer section technology, the component length of the mixing zone necessary for the same mixing quality can be reduced by about 50% with respect to an extruder which operates only on the pin-lined barrel principle.

Due to the arrangement of radially adjustable restricting pins which protrude radially in the part of the transfer zone of the extruder barrel in which the barrel channels have approximately their greatest channel volume, the proposed extruder can be set for the processing of different rubber compounds. Consequently, the plasticizing capacity or the frictional energy converted in the transfer section for the extrudate can be preselected as desired, and specifically for the particular compound, by the depth of penetration of the restricting pins into the barrel channels and into the processing space of the extruder. Consequently, along with the screw speed and the processing section temperature, recourse can be made to a further freely selectable process parameter in comparison with the previously known generic extruders.

The design of the extruder screw and of the barrel bush in the transfer zone also allows inexpensive manufacture while maintaining the self-cleaning capability and mixing quality of the extruder, inasmuch as the number of channels and consequently the number of flights is independent of the channel cross-sectional area.

Finally, the use of barrel grooves, known per se, in the feed zone of the extruder, in combination with the pin-lined barrel section and transfer section, allows a further surprising improvement in the mixing quality and output rate of the extruder In particular, in the case of rubber-based extrudates which are difficult to process, an extruder feed zone, in which a helical groove was made in the extruder barrel inner wall, had its starting point below the feed opening of the extruder, and was formed downstream along a length of about 3 screw diameters, proved to be particularly advantageous. The groove had a maximum depth of about 1 cm and a constant width of 2.5 cm and ran slowly out at each of its ends to the barrel inner diameter. The pitch of the groove corresponded approximately to that of the extruder screw in the feed zone.

With a feed zone of such a design, the output of the extruder was distinctly improved and the mixing quality of the extrudate increased still further. A series of tests with an extruder of lesser groove depth (about 0.5 cm) showed clear deteriorations both in the working characteristics and in the mixing quality. In addition, it was possible to verify that the same extruder with the described grooves in the feed zone and the described transfer section, but without the pin-lined barrel section arranged ahead of this transfer section, produced a distinctly poorer mixing quality. Special extrudates which can be mixed continuously only with difficulty, such as for instance rubber compounds for tank chain studs, could not be mixed satisfactorily with such an extruder. This makes it clear that the combination of a pin-lined barrel section and a transfer section is necessary for the desired mixing result in the case of such extrudates. The helical groove improves the mixing quality and the output of the extruder still further, however.

BRIEF DESCRIPTION OF THE DRAWINGS

The invention can be explained with reference to illustrative embodiments and the accompanying drawings, in which.

DETAILED DESCRIPTION OF THE PREFERRED EMBODIMENTS

Figure 1:
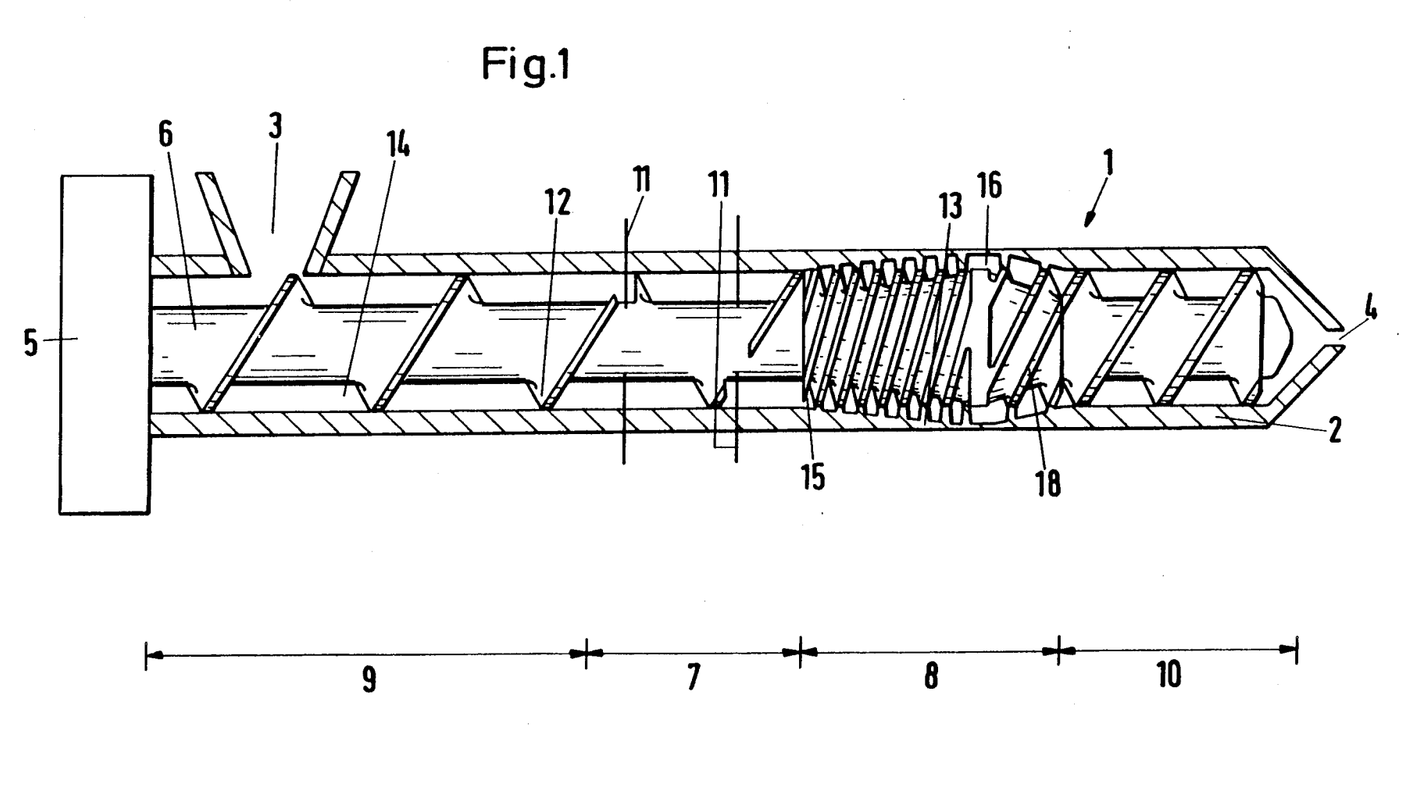
FIG. 1 is a longitudinal section through a single-screw extruder without restricting pins in the transfer section.

FIG. 1 comprises a diagrammatical longitudinal section through a single screw extruder 1. Arranged inside the extruder barrel 2 is an extruder screw 6 which is driven about its longitudinal axis by a drive unit 5. The barrel 2 has in the region of its upstream end a feed opening 3 for the material to be extruded, with the ready-mixed and homogenized extrudate leaving the extruder through the outlet opening 4.

The extruder screw 6 has in the feed zone 9 a screw geometry which is suitable for drawing the material fed through the feed opening 3 into the extruder and plasticizing it in a way known per se.

Provided downstream of this feed zone is a pin-lined barrel zone 7, in which two rows of pins shown diagrammatically at 11 protrude radially through the extruder barrel 2, in the direction of the screw axis, into the processing space 14 of the extruder. In this zone 7, the screw flights 12 are interrupted in a known way in the plane of the pins in order to avoid collision with the pins 11.

Arranged downstream of the pin-lined barrel zone 7 is a transfer zone or section 8 in which, in this illustrative embodiment, the angles between the flights 18 of the extruder screw 6 and the flights 13 of the extruder barrel 2 are greater than or equal to 105° and, with respect to one another, do not form angles complementary to 90°.

The transfer zone 8 can be divided into a feed zone and a discharge zone, the two zones being separated from each other by the barrel channel of the greatest channel depth.

In this transfer zone 8 of the extruder, the number of channels is constant in the feed zone and discharge zone, as a result of which the number of flights in the feed zone or discharge zone is independent of the channel cross-section of the barrel channels 16 and screw channels 15.

The last processing section of the extruder screw 6 comprises the discharge or pressure increasing zone 10, in which the screw geometry is chosen such that the melt pressure can be raised to the necessary mold pressure in a known way.

Apart from this illustrative embodiment, other possible ways of realizing this pin transfer extruder are also conceivable. For example, the transfer zone 8 could also be arranged upstream of the pin-lined barrel zone 7, although the variant presented above yields the better mixing and homogenizing results. In addition, it should be mentioned here that the pin-lined barrel zone also fulfills its mixing and homogenizing function if it has more than two rows of pins. As far as the ratio between costs and mixing quality is concerned, the pin-lined barrel zone is best equipped with one to five rows of pins.

The preferred length of the individual extruder zones, where the extruder length is 10 screw diameters (D), is about 3 D for the feed zone, 1.5 to 10 D, preferably 1.5 to 2 D, for the pin-lined barrel zone, 2 to 2.5 D for the transfer zone and about 3 D for the pressure build-up zone.

Independently of these specifications, however, additional processing zones can also be arranged, according to requirements, ahead of, after or between the pin-lined barrel zone and transfer zone, such as for example venting or kneading zones.

Figure 2:
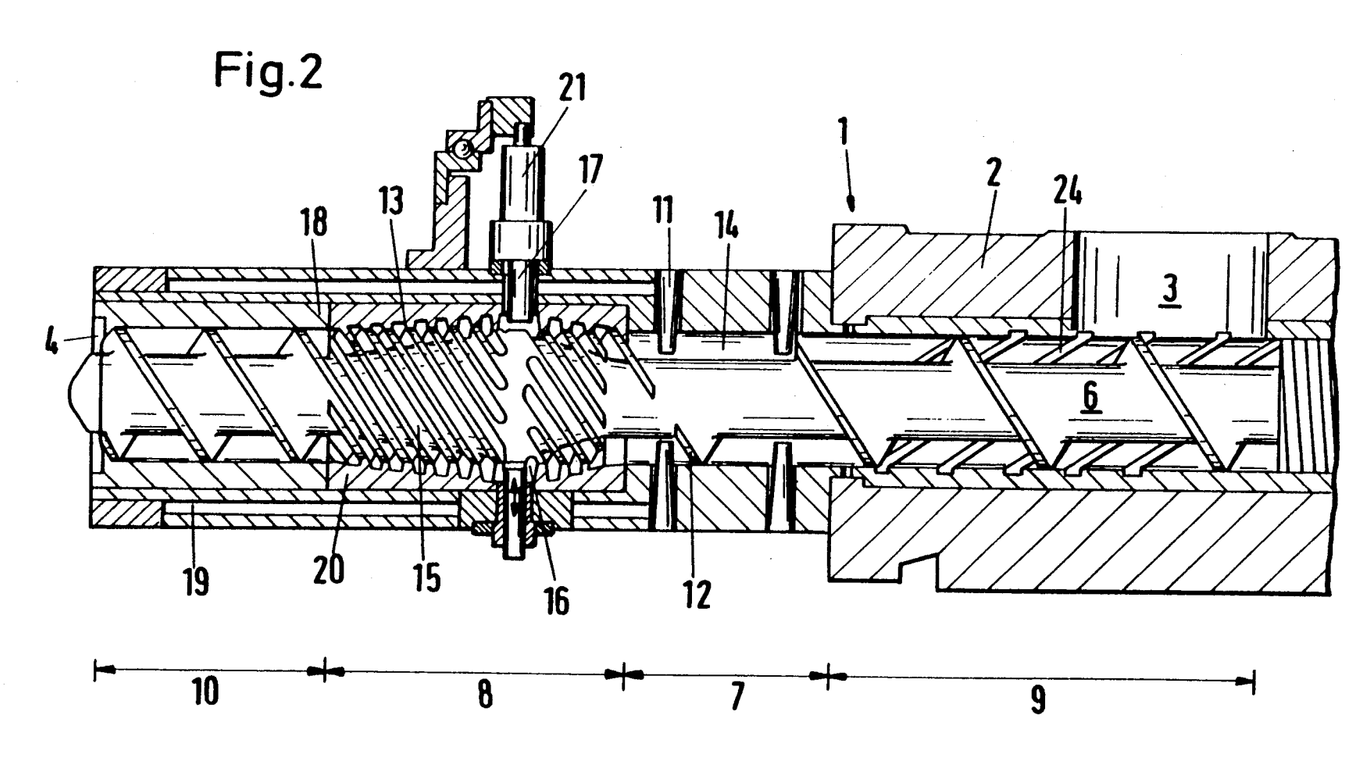
FIG. 2 is a longitudinal section through a single-screw extruder with restricting pins in the transfer section, FIGS. 3a–c comprise graphical representation of test results with an extruder of the proposed design in comparison with the conventional pin-lined extruder.

In FIG. 2 there is illustrated a pin transfer extruder 1 having restricting pins 11 in the transfer component. In FIG. 2, the extruder is oriented in an opposite direction relative to the extruder of FIG. 1. In the FIG. 2 extruder as well, the feed zone 9 corresponds to the usual cold-feed extruder and has a preferred ratio of screw length (D) to screw diameter of three.

Arranged after the feed zone 9 is an extruder section of an overall length of 6 D, and in which the pin-lined barrel zone 7 having two successively arranged planes of extruder pins 11 is located. Provided downstream of the pin-lined barrel zone 7 is the transfer zone 8, of about 2 D, and the pressure build-up zone 10, of about 1.5 D in length.

The temperature control of the extruder barrel 2 is performed in a known way by temperature control bores 19 in the barrel wall 2. In this illustrative embodiment, the transfer section of the extruder barrel is in the form of a barrel bush 20 mounted in the barrel 2.

The pitch of the channels of the extruder screw and transfer section bush are chosen such that the flights between the screw and the bush form an angle equal to or greater than 105°. An advantageous result of this is that, on passing this transfer section, by virtue of the consequent great number of points of intersection between screw flights and bush flights per screw revolution, the extrudate is subjected to an intensive shearing process.

In contrast to the screw channels, the bush channels are not interrupted in the transfer section. Rather, they wind continuously and constantly from the feed zone of the transfer section to its discharge zone in approximately increasing or decreasing spiral form about the imaginary longitudinal axis of the extruder.

In the first third of the transfer section, the screw core diameter increases from the maximum channel depth to the outside diameter, i.e. the channel volume of the screw 6 drops from the maximum value in the feed zone to zero. The channel volumes of the bush 20 exhibit the converse tendency. Consequently, the passage volume effectively available for the extrudate is kept constant in the axial and radial directions of transport. Owing to these conditions, a 100% extrudate exchange inevitably takes place between screw 6 and barrel bush 20.

In the case of the about 1.4 D long outlet zone of the transfer section according to FIG. 2, the channel volume of the screw 6 increases continuously and, in the case of the bush 20, it decreases continuously, the overall channel volume of screw and bush available for the extrudate again being kept constant.

In the case of this illustrative embodiment as well, the number of channels in the feed zone and in the discharge zone of the transfer zone 8 is constant, as a result of which the number of screw and barrel bush flights is independent of the screw and barrel channel cross-sectional areas.

Extensive investigations have shown that, in particular in the processing of high-viscosity natural rubber compounds, the preplasticizing of the extruder in the pin zone at low shear rates before the intensive plasticizing work in the transfer section has the effect both of increasing output and of positively influencing the surging behavior of the machine.

Along with the screw speed and the processing section temperatures, the machine has a further process parameter which is freely preselectable and broadens the universality of the machine with regard to the processability of a wide range of different rubber compounds.

At the end of the first third of the transfer zone 8 there is in this embodiment a restricting element which includes pins 17 distributed symmetrically around the circumference of the transfer component, which pins can enter radially into the uninterrupted channels of the transfer section bush 20 and thus reduce the channel volume of the bush 20 in this zone from the maximum value to zero.

With these restricting pins 17, which are adjusted from outside either manually or hydraulically, the plasticizing capacity or the frictional energy converted in the transfer section for the extrudate can be preset as desired.

These restricting pins 17 can be accredited, inter alia, with the success for the first time of using the pin transfer extruder to process rubber compound grades which previously could not be processed with adequate homogeneity by cold-feed extrusion, not even by the use of specially optimized pin-lined barrel extruders. The grades concerned are grades of natural rubber, for example for the production of tank chain studs, as well as tread rubber compounds with the same base polymer for truck and EM tires.

If the test results achieved thus far with an extruder of the present invention are summarized, it may be stated that, in comparison with the pin-lined barrel extruder, increases in output rate of 25% to 50% can be achieved in the case of low-viscosity synthetic rubber compounds up to viscosities of 55 to 60 ML 1+4 (100° C.), with a reduction in the specific energy of up to 20%

In the case of high-viscosity natural rubber grades which are difficult to process, between 90 and 120 ML 1+4 (100° C.), the advantages are even more evident, since, as has been found, the limit of extrudate homogeneity on the pin-lined barrel extruder is already reached at an output of about 800–1000 kg/h and, consequently, in individual cases doublings of output on the pin transfer extruder appear possible.

Figure 3A:
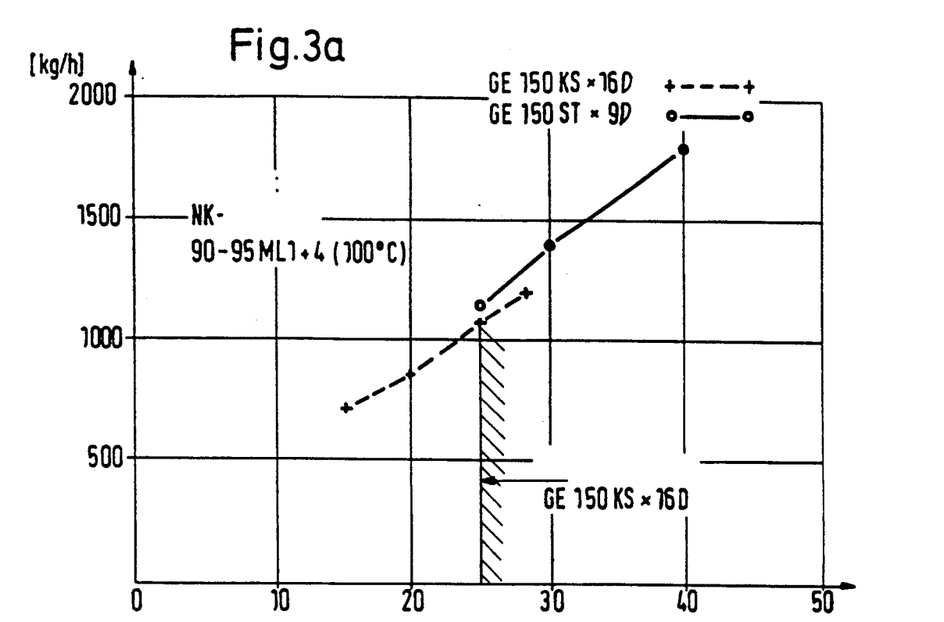
Figure 3B:
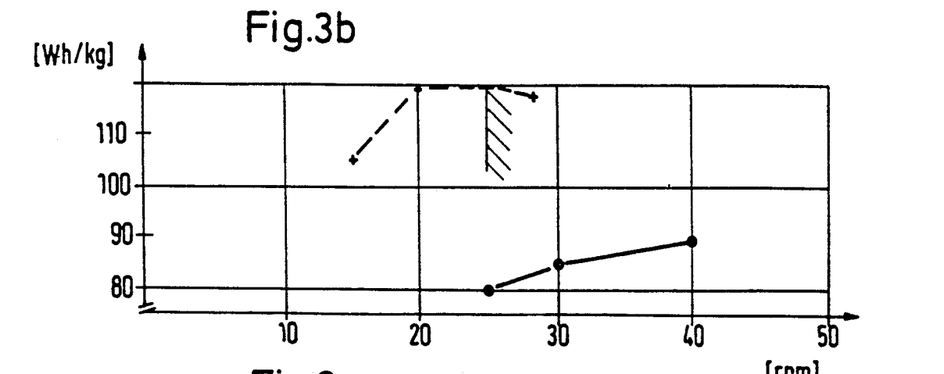
Figure 3C:
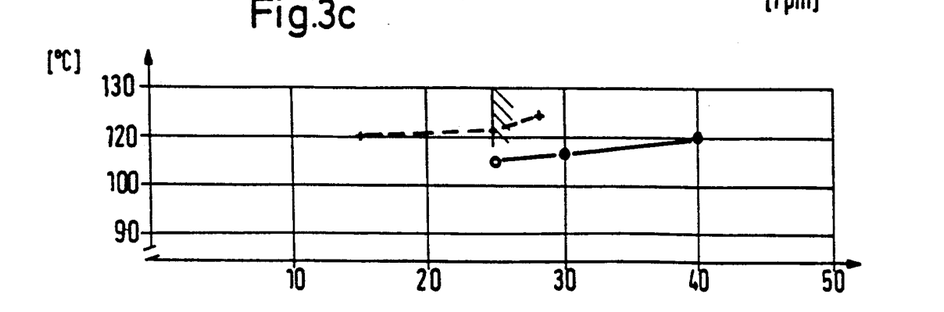

FIGS. 3a, 3b and 3c show in graphical representation test results which were achieved with an extruder of the prior art (broken curves) and a laboratory transfer pin extruder (solid curves) of the present invention and of comparable size. The prior art extruder is designated GE 150 KS×16D, and the extruder of the invention is designated GE 150 ST×9D. A natural rubber compound NK 90-95 ML 1+4 (100° C.), which is known to have high viscosity and to be particularly difficult to process, was used as extrudate. In all three representations, the speed of 25 revolutions per minute, up to which the conventional extruder was able to process such a rubber compound with acceptable quality, was utilized, which speed has been marked by a vertical line with shading.

In FIG. 3a, the rubber output is plotted as a function of the screw speed, whereas FIG. 3b represents the melt temperature and FIG. 3c represents the specific energy requirement per kg of extrudate, in each case as a function of the screw speed. Taken together, these three diagrams show that, with the extruder concept of the present invention, a high extrudate output with excellent mixing and homogenizing effect is possible at an acceptable extrudate temperature and with considerably reduced use of energy.

Added to this is the fact that problems of product porosity in the profile, which on the pin-lined barrel extruder occurred already in the lower output range, were not encountered at all on the pin transfer extruder.

Figure 4:
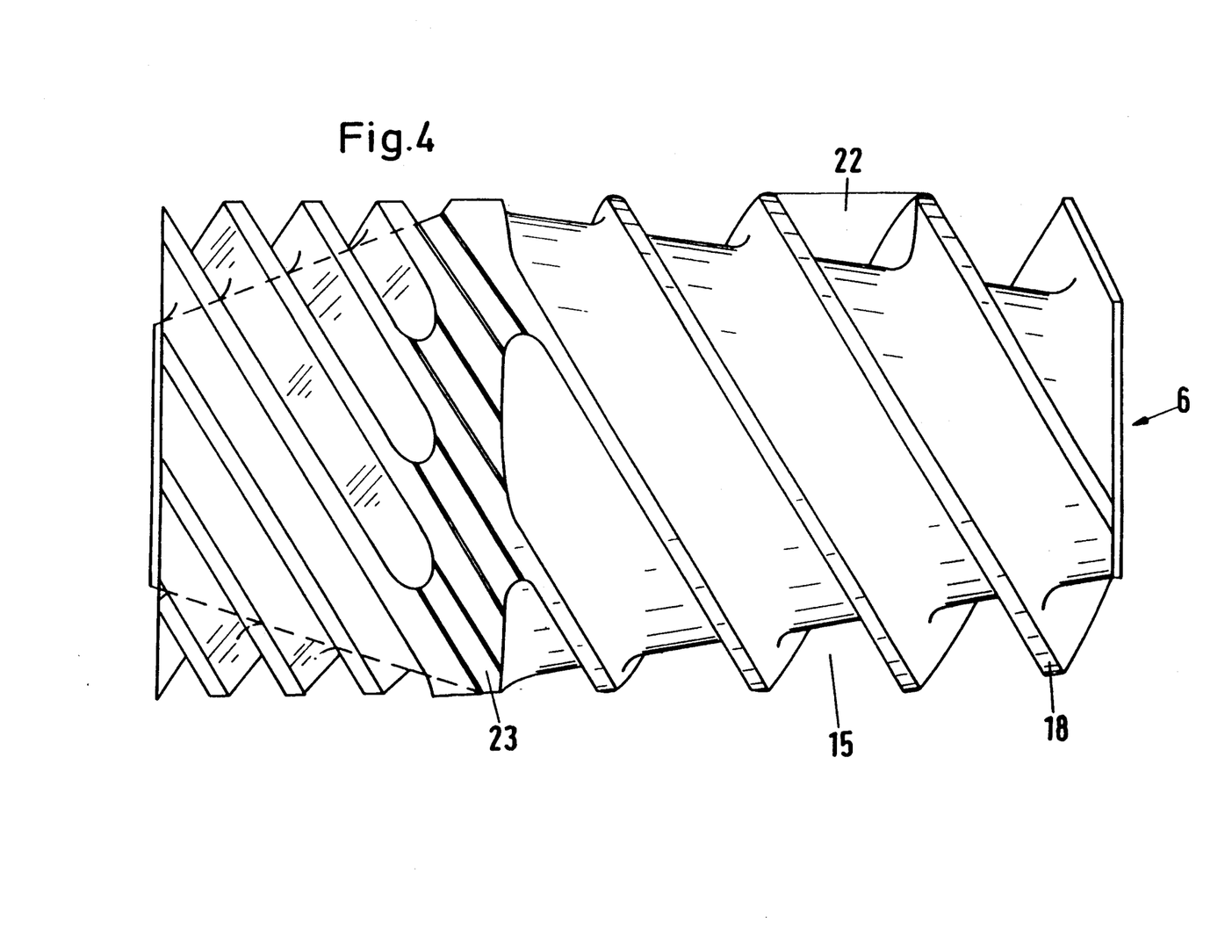
FIG. 4 is a diagrammatical side view of a transfer screw section.

In FIG. 4, the extruder screw 6 is represented in the transfer zone 8 in an illustrative embodiment. The increase and decrease of the screw channel cross-sectional areas in the feed zone and discharge zone, known in principle, is brought about here only by the conical variation of the core cross-section, that is the channel depth, of the screw. Although the number of channels in the feed zone differs to that in the discharge zone, it is constant in the respective zone. This has the consequence that the number of flights is independent of the channel cross-sectional area 22.

FIG. 4 also reveals in a further embodiment that the transfer screw has in the region of maximum extrudate transfer to the barrel channels, that is approximately in the region of the restricting pins 17, grooves 23 in the screw core. Although these grooves 23 connect the screw channels in the feed zone and in the discharge zone to one another, they do not allow any material transport through them, owing to their small depth of about 1 mm and their small width of about 10 mm. Rather, with their help the mixing efficiency of the transfer zone can be improved, even in the case of difficult extrudates. This takes place essentially by virtue of the fact that additional shearing edges are made available by these grooves.

Figure 5:
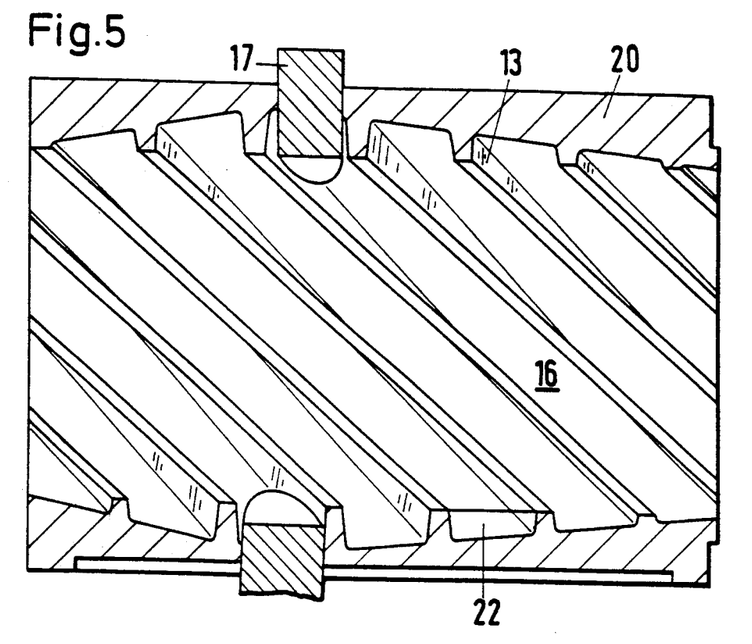
FIG. 5 is a diagrammatical side view of a cut-open transfer bush section.

FIG. 5 comprises a diagrammatic longitudinal section through the transfer barrel bush 20, which interacts with the transfer screw according to FIG. 4. Here too it becomes clear that the number of barrel channels is constant in each case in the feed zone and in the discharge zone, so that the number of barrel flights remains independent of the barrel channel cross-section.

Figure 6:
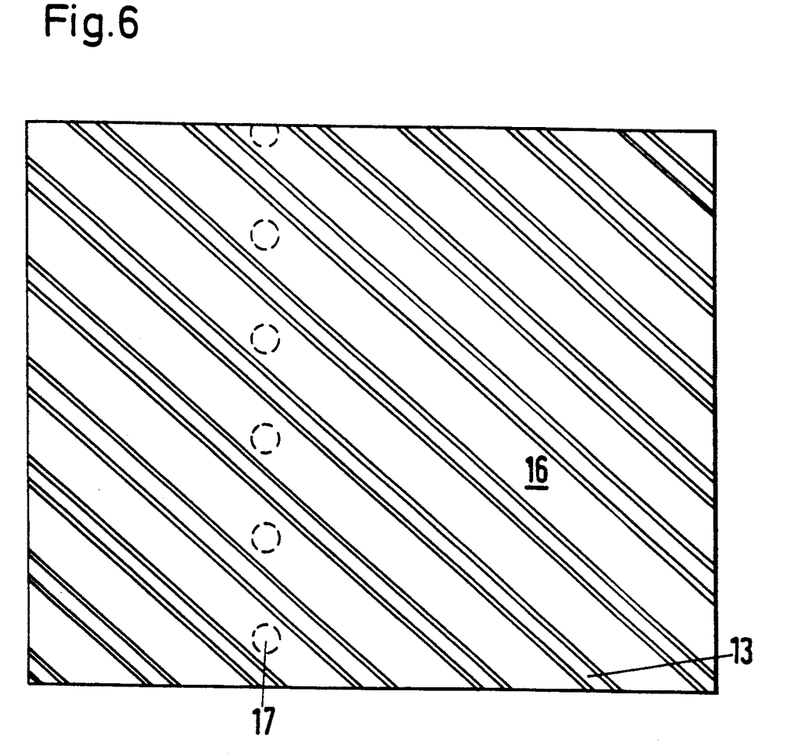
FIG. 6 is a developed view of the bush section according to FIG. 5.

Due to this design, on the one hand excellent mixing quality with a very good self-cleaning effect is ensured. At the same time, which can be clearly seen particularly with the developed view of the bush component according to FIG. 6, the manufacturing outlay for barrel (and screw) channels of the same width is reduced considerably.

In addition, it should be pointed out that the pin-lined barrel extruder of the present invention can be used with or without restricting pins in the transfer section, although restricting pins should not be dispensed with for the optimal type of design. Finally, by the positioning of the restricting pins, the extruder can be adjusted to a very wide variety of rubber compounds and their processing parameters, and consequently can be used universally by the user. In a less than optimal embodiment, the adjustable restricting pins may also be arranged at the downstream end of the extruder, for instance at the end of the pressure build-up zone 10.

Figure 7:
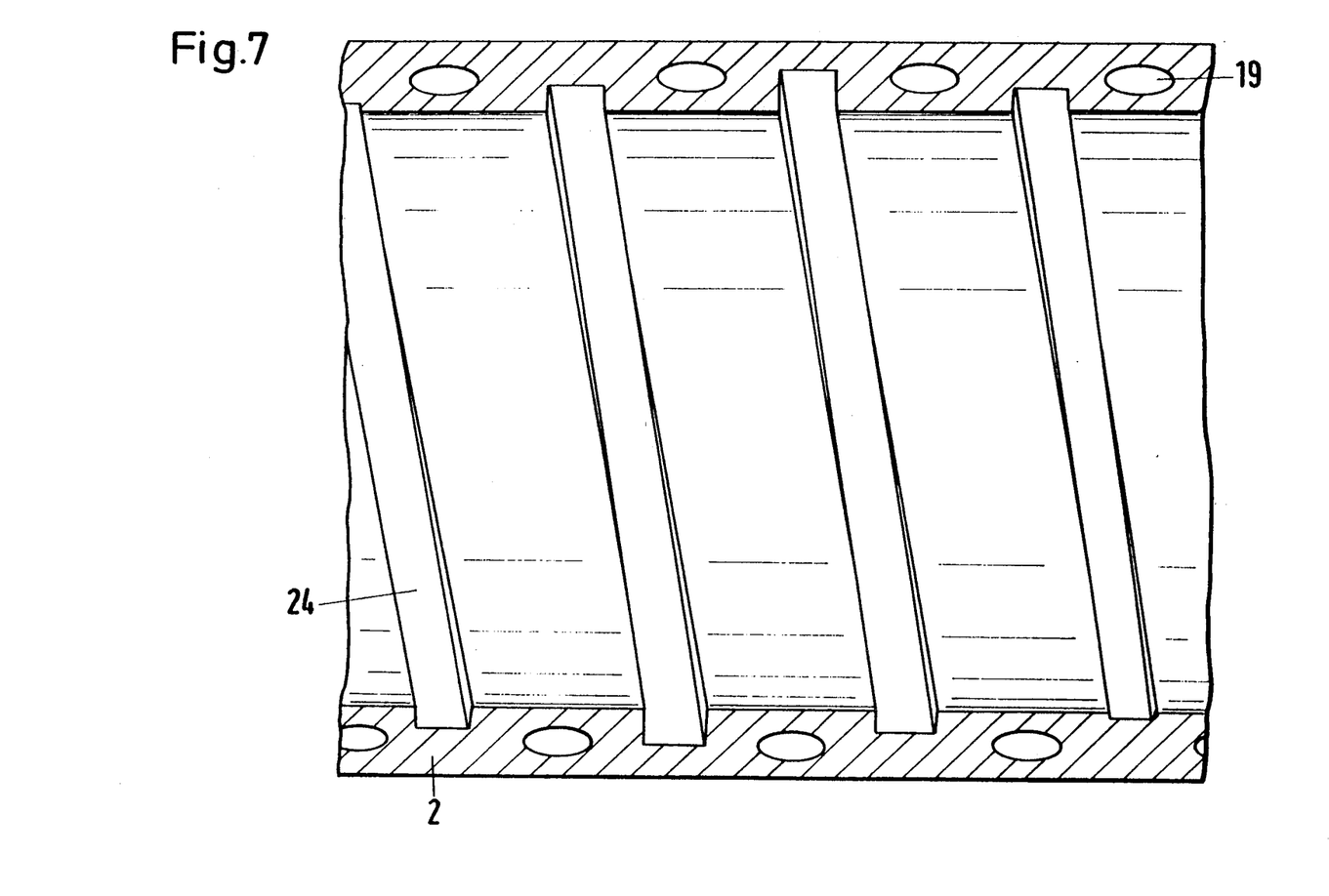
FIG. 7 is a longitudinal section through the extruder barrel in the region of the feed zone.

Finally, in FIG. 7 a longitudinal section through the extruder barrel 2 with a barrel groove 24 in the feed zone 9 is represented. In this illustrative embodiment, the helical barrel groove 24 has a depth of about 1 cm and a width of about 2.5 cm, although other groove depths and widths are also conceivable. However, the groove depth should not be chosen to be greater than the groove width, and groove depth and groove width should not be less than 0.3 cm. The pitch of the groove 24 corresponds approximately to the pitch of the extruder screw in this region and extends over a length of about 3 to 5 screw diameters. At its ends, the depth of the groove 24 decreases slowly, until finally the barrel inner wall is formed without grooves. In a preferred embodiment, the groove 24 spirals oppositely to the screw pitch (FIG. 2).

Due to the use of such a groove in the feed zone 9 of the extruder barrel 2, an increased barrel wall area is available to the extrudate to be plasticized and to be mixed, as a result of which, due to the thereby increased adhering effect, the feed performance and consequently the surging performance of the extruder are improved. In addition, an increased heat transfer area can be made available by the groove walls, this largely preventing undesired preplasticizing in the feed zone of the extruder, in particular in the case of a cooled extruder barrel (see cooling channel 19 in FIG. 7).

What is claimed is:

1. An extruder for the processing and production of rubber and thermoplastics materials, comprising:
    an extruder barrel having an inner surface and a longitudinal axis an inlet opening in a feed zone, and an outlet opening, said inner surface of said barrel in said feed zone being formed with a helical groove;
    an extruder screw mounted for rotation about its longitudinal axis in said barrel, said screw being formed with screw flights having channels therebetween which define with said barrel a processing space, and means for driving said screw, and wherein
    said extruder has successively arranged mixing and homogenizing zones, said mixing zone comprising a pin-lined barrel zone in which pins protrude radially into the processing space of the barrel, said screw flights being interrupted in the region of said pins to accommodate screw rotation.
    said homogenizing zone comprising a transfer section in which said extruder screw has a constant reduction in its channel volume to zero from a feed portion of said transfer section to a discharge portion of said transfer zone, and then a channel volume increase up to a maximum value, and in which said extruder barrel has uninterrupted barrel channels which increase their channel volume from zero to a maximum value from said feed portion to said discharge portion of the transfer section, to drop subsequently back to a channel volume of zero, and in which the barrel channels are disposed approximately helically about the longitudinal axis of said extruder, radially adjustable restricting pins arranged in the region of the maximum channel volume of the barrel channels so as to protrude through the barrel and into the barrel channels as well as into the processing space, and wherein the number of channels, and consequently the number of screw flights and barrel flights, in constant in the feed portion and in the discharge portion of the transfer section independently of the barrel and screw channel cross-sectional areas.

2. The extruder as claimed in claim 1, wherein the pin-lined barrel zone is arranged upstream of the transfer section.

3. The extruder as claimed in claim 1, wherein the feed zone of the extruder is upstream of the mixing and homogenizing zones, downstream of both of which is a zone in which the extrudate pressure is increased so that the extrudate can be extruded to the necessary mold pressure.

4. The extruder as claimed in claim 3, wherein, with an extruder length of 10 screw diameters (D), the feed zone is 3 D, the pin-lined barrel zone is 1.5 to 2 D, the transfer section is up to 2.5 D, and the pressure-increasing zone is about 3 D long.

5. The extruder as claimed in claim 1, wherein one to five rows of pins are arranged in the pin-lined barrel zone.

6. The extruder as claimed in claim 1, wherein the transfer section of the extruder is designed in such a way that the angles between the flights of the extruder screw and the flights of the extruder barrel are greater than or equal to 105° and do not form angles complementary to 90°.

7. The extruder as claimed in claim 1, wherein the adjustable restricting pins are arranged at the downstream end of the extruder.

8. The extruder as claimed in claim 1, wherein the restricting pins can be moved by means of mechanically, pneumatically or hydraulically operable actuating mechanisms.

9. The extruder as claimed in claim 1, wherein the extruder screw has in the transfer section flat and narrow grooves, which connect the screw channels on the feed side and on the discharge side to one another.

10. The extruder as claimed in claim 1, wherein said groove is oriented oppositely to the pitch in the feed zone of the extruder screw.

11. The extruder as claimed in claim 1, wherein the groove has a width of 1 to 3 cm and a depth of 0.5 to 1.5 cm.

12. The extruder as claimed in claim 11, wherein the groove depth slowly decreases to zero in its end zones, and wherein the groove extends helically over a length of 1 to 3 screw diameters.

13. The extruder as claimed in claim 1, wherein the extruder barrel is formed with temperature control bores in which a heat exchange fluid can pass for controlling the temperature of the barrel.

* * * * *